United States Patent
Moore et al.

(10) Patent No.: US 6,447,672 B1
(45) Date of Patent: *Sep. 10, 2002

(54) CONTINUOUS PLURAL STAGE HEATED VAPOR INJECTION PROCESS FOR RECOVERING LUBE OIL BASE STOCKS FROM USED MOTOR OIL FORMULATIONS, AND ASPHALT BLEND COMPOSITIONS CONTAINING USED MOTOR OIL BOTTOMS FROM SAID PROCESS

(75) Inventors: Howard F. Moore, Ashland; Donald P. Malone, Grayson, both of KY (US)

(73) Assignee: Marathon Ashland Pertoleum LLC, Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/574,919

(22) Filed: May 19, 2000

Related U.S. Application Data

(63) Continuation-in-part of application No. 09/026,367, filed on Feb. 19, 1998, now Pat. No. 6,068,759.

(51) Int. Cl.[7] .................. C10M 175/00; C10G 33/00
(52) U.S. Cl. .................. 208/179; 208/184; 208/185; 208/187
(58) Field of Search .................. 208/179, 184, 208/185, 187

(56) References Cited

U.S. PATENT DOCUMENTS

| 4,101,414 A | 7/1978 | Kim et al. |
| 5,244,565 A | 9/1993 | Lankton et al. |
| 5,302,282 A | 4/1994 | Kalnes et al. |
| 5,447,628 A | 9/1995 | Harrison et al. |
| 6,068,759 A | * 5/2000 | Moore et al. |

* cited by examiner

*Primary Examiner*—Marian C. Knode
*Assistant Examiner*—Tam M. Nguyen
(74) *Attorney, Agent, or Firm*—Emch, Schaffer, Schaub & Porcello Co., L.P.A.

(57) ABSTRACT

A continuous, hot vapor injection process and apparatus is provided for recovering lube oil base stocks from used lubricating oil containing distillable liquid hydrocarbons and water. Also disclosed is an asphalt blend composition containing an asphalt component and the bottoms from the above process.

9 Claims, 1 Drawing Sheet

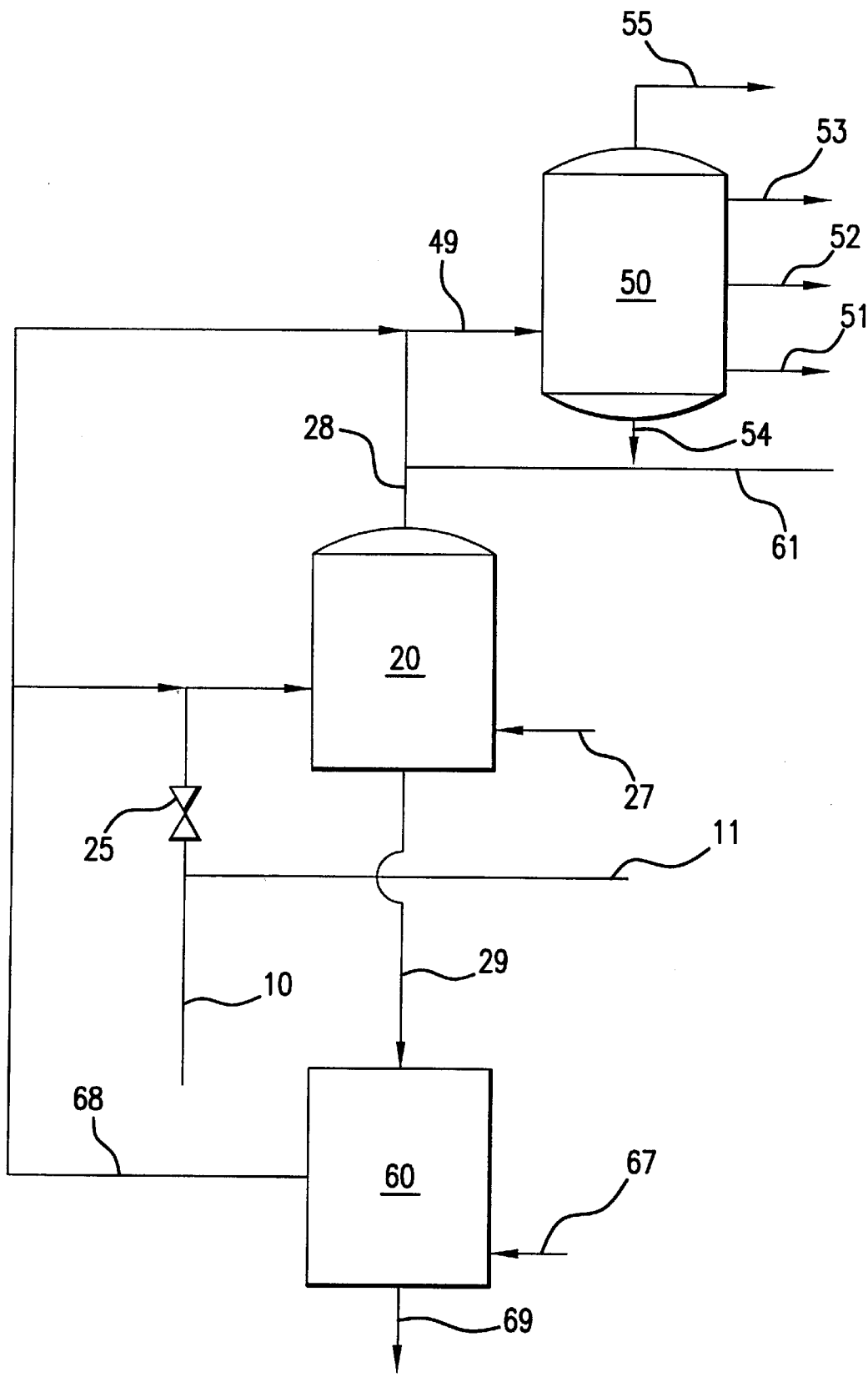
FIGURE

CONTINUOUS PLURAL STAGE HEATED VAPOR INJECTION PROCESS FOR RECOVERING LUBE OIL BASE STOCKS FROM USED MOTOR OIL FORMULATIONS, AND ASPHALT BLEND COMPOSITIONS CONTAINING USED MOTOR OIL BOTTOMS FROM SAID PROCESS

CROSS REFERENCE TO RELATED APPLICATIONS

This application is a continuation in part of prior, application Ser. No. 09/026,367 filed Feb. 19, 1998. now U.S. Pat. No. 6,068,759.

BACKGROUND OF THE INVENTION

This invention relates to a process for recovering lube oil base stocks from used motor oil formulations. In particular, this invention relates to the removal of metallic additive packages from the waste oil to facilitate further processing of the used motor oil. The invention further relates to asphalt blend compositions containing used motor oil bottoms from the process, and asphalt pavement compositions containing the asphalt blend compositions.

Automotive lubricating oils are usually formulated from paraffin based petroleum distillate oils or from synthetic base lubricating oils. Lubricating is oils are combined with additives such as soaps, extreme pressure (E.P.) agents, viscosity index (V.I.) improvers, antifoamants, rust inhibitors, antiwear agents, antioxidants, and polymeric dispersants to produce an engine lubricating oil of SAE 5 to SAE 60 viscosity.

After use, this oil is collected from truck and bus fleets, automobile service stations, and municipal recycling centers for reclaiming. This collected oil contains organo-metallic additives such as zinc dialkylthiophosphate from the original lubricating oil formulation, sludge formed in the engine, and water. The used oil may also contain contaminants such as waste grease, brake fluid, transmission oil, transformer oil, railroad lubricant, crude oil, antifreeze, dry cleaning fluid, degreasing solvents such as trichloroethylene, edible fats and oils, mineral acids, soot, earth and waste of unknown origin.

Reclaiming of waste oil is largely carried out by small processors using various processes tailored to the available waste oil, product demands, and local environmental considerations. Such processes at a minimum include chemical demetallizing or distillation. The presence of organo-metallics in waste oils such as zinc dialkylthiophosphate results in waste oils becoming sticky, overly viscous and thus difficult if not impossible to process. Moreover, the resulting sludge created reduces the amount of salable product, as well as creating additional disposal problems.

Successful reclaiming processes require the reduction of the organo-metallics (or ash) content to a level at which the hot oil does not become sticky. Such reduction can be carried out by chemical processes which include reacting cation phosphate or cation sulfate with the chemically bonded metal to form metallic phosphate or metallic sulfate. U.S. Pat. No. 4,432,865 to Norman, the contents of which are incorporated herein by reference, discloses contacting used motor oil with polyfunctional mineral acid and polyhydroxy compound to react with undesired contaminants to form easily removable reaction products. These chemical processes suffer from attendant disposal problems depending on the metal by-products formed. Ash content can also be reduced by heating the used lubricating oil to decompose the organo-metallic additives. However, indirect heat exchange surfaces cannot be maintained above 400° F. (204° C.) for extended periods without extensive fouling and deposition of metals from the additives. Used lubricating oils can be heated to an additive decomposition temperature of 400° F. (204° C.) to 1000° F. (538° C.) by direct heat exchange by mixing with a heated product oil as disclosed in U.S. Pat. No. 5,447,628 to Harrison, et al., the contents of which are incorporated herein by reference. Although '628 claims to be direct contact heat exchange, the "contact" occurs when the UMO is added to lower portion of a fractionator having a fired heater. U.S. Pat. No. 4,101,414 to Kim, et al., incorporated herein by reference, discloses predistillation by steam stripping for several hours of a used lubricating oil stock in order to remove light oil, residual water, sulfur, and $NO_x$. The temperature is kept at temperatures which avoid additive breakdown, and the process provides a concentrate product upon vacuum distillation. Flow processes using heat exchange by direct contact with hot hydrogen have been proposed but are expensive in view of the costs associated with hydrogen compression and hydrogen's low heat capacity. Such processes include UOP's Hy-Lube described in U.S. Pat. Nos. 5,244,565 and 5,302,282 which feature an initial used oil feed fractionation step to remove sludge and a majority of metals utilizing a hot circulating hydrogen stream as a heating medium to avoid deposition of decomposed organo-metallic compounds on heating surfaces, followed by a hydrotreating circuit with caustic neutralization to eliminate chlorides, with a final product fractionation step. Flow processes utilizing steam have also been proposed. However, even when used motor oil is directly heated, i.e., in the absence of heat transfer surfaces, the nozzles and downstream piping can plug in 24 to 72 hours due to the presence of organo-metallic compounds.

Allowed U.S. patent application Ser. No. 09/026,367, filed Feb. 19, 1998, discloses a process for recovering lube oil base stocks from used lubricating oil formulations containing base oil stock and organo-metallic component by directly contacting used lubricating oil with a heated vapor, e.g., steam, under conditions which at least partially decompose the organo-metallic component and provide a desired volume of pumpable bottoms containing organo-metallic compound decomposition products and an overhead comprising gases and distillable hydrocarbons, with no substantial carryover of metals into the overhead.

It would be advantageous to provide an efficient method for recovering used motor oil by thermal treatment using direct heat exchange in a process which does not require apparatus susceptible to clogging or fouling which can be carried out by continuous addition of used motor oil to the system. It would also be advantageous to provide a process for treating used motor oil which does not require preseparation of light materials or water found in used motor oil as collected.

SUMMARY OF THE INVENTION

The present invention is a continuous, plural stage, heated vapor injection process for recovering lube oil base stocks from used lubricating oil containing distillable liquid hydrocarbons and water which comprises providing a continuous flow of used lubricating oil and heated vapor to a first stage and directly contacting said used lubricating oil with said heated vapor and providing a steady state balance of temperature, used lubricating oil addition, and heated vapor addition sufficient to remove substantially all water and optionally some light ends from said first stage as an overhead stream, thereby providing a first stage bottoms fraction containing distillable hydrocarbons; continuously removing said first stage bottoms fraction from said first stage to one or more subsequent stages, and directly contacting said bottoms fraction with said heated vapor under conditions sufficient to provide a subsequent stage bottoms fraction which is 5 to 80 wt. % of the initial volume of said used lubricating oil, and a distillable hydrocarbon overhead; and collecting said distillable hydrocarbon overhead and said bottoms fraction from said subsequent stage(s).

In another aspect, the present invention relates to a plural stage apparatus for treating used lubricating oil comprising: a first stage treating zone comprising an inlet for used motor oil, an inlet for heated vapor, an outlet for vaporized overhead and an outlet for first stage bottoms, a subsequent stage treating zone comprising an inlet for first stage bottoms, an inlet for heated vapor, an outlet for a bottoms fraction, and an outlet for distillable hydrocarbon overhead.

In yet another aspect, the present invention relates to an asphalt blend composition which comprises an asphalt component and a bottoms fraction obtained from used lubricating oil formulations containing distillable liquid hydrocarbons and water comprising: providing a continuous flow of used lubricating oil and heated vapor to a first stage and directly contacting said used lubricating oil with said heated vapor and providing a steady state balance of temperature, used lubricating oil addition, and heated vapor addition sufficient to remove substantially all water, if present and light ends from said first stage as an overhead stream, thereby providing a first stage bottoms fraction containing distillable hydrocarbons; continuously removing said first stage bottoms fraction from said first stage to one or more subsequent stages, and directly contacting said bottoms fraction with said heated vapor under conditions sufficient to provide a subsequent stage bottoms fraction which is 5 to 50 vol. % of the initial volume of said used lubricating oil, and a distillable hydrocarbon overhead; and collecting said bottoms fraction from said subsequent stage(s).

By the term vapor is meant a material in gaseous form as introduced into the present process. This would include those materials which can be in a non-gaseous form at room temperature, e.g., $H_2O$ (steam). The heated vapor employed in the present invention is selected from the group of gases/vapors consisting of methane, ethane, propane, and steam. The heated vapor is introduced in the first stage which itself may comprise a vessel at temperatures ranging from 450 to 1800° F., preferably from 500 to 1100° F., at a rate of 0.1 to 10 pounds/pound of charge, more preferable 0.5 to 5 pounds/pound of charge and most preferably 1 to 3 pounds/pound of charge. Superficial velocities are low enough to prevent entrainment of organo-metallic compounds in the overhead, generally no greater than 5.5 feet per second, preferably no greater than 3 feet per second. Vaporization temperatures achieved in the vessel can range from 400 to 1000° F., preferably 550 to 650° F. The used lubricating oil is contacted with the heated vapor for a period ranging from 0.1 to 2 hours, e.g., 1 hour, preferably 0.25 to 0.5 hours. The vaporization temperatures, heated vapor (steam) rates, superficial velocities, used lubricating oil addition rates, and contact times are adjusted to provide a preset volume reduction of the total amount of used lubricating oil added to the process (or degree of lift of overhead vapors), e.g., ranging from 20 to 95 wt. %, preferably from 60 to 90 wt. % of the total amount of used lubricating oil added to the vessel.

In one embodiment of the present invention, the heated vapor from the first and/or subsequent stages is recovered from the overhead and recycled to the first stage. This is especially useful where the heated vapor is selected from the group consisting of methane, ethane, and propane.

The above conditions may be varied to adjust the extent of decomposition of the organo-metallic component made up of organo-metallic compounds in the used lubricating oil. Used lubricating oils processed by the present invention may contain organo-metallic compounds in a concentration of 0.01 to 5.0 wt. %. The treatment of the present invention can be used to decompose the organo-metallic component to the extent desired, e.g., sufficient to provide a product having an organo-metallic component concentration of 0.005 wt. % or less, preferably less than 0.001 wt. %.

In an especially preferred embodiment, the heated vapor employed is superheated steam. The fouling of used motor oil-contacted surfaces ordinarily observed during UMO processing does not occur in this embodiment. The use of steam may lower partial pressure of the vaporization of the overhead so that vaporization temperatures no greater than 650° F. or even 600° F. can be used. Such lower vaporization temperatures combined with lower contact times may be particularly desirable inasmuch as they may minimize the decomposition of valuable additives of the used lubricating oils, such as viscosity index improvers, pour point depressants, defoamants, and detergent-dispersants, which can be present in used lubricating oils in amounts of at least 0.1 wt. %, e.g., ranging from 0.1 to 25 wt. %, preferably 1 to 10 wt. %.

The presence of these high molecular weight polymer additives in the pumpable bottoms fraction can be especially advantageous when the bottoms are added to such products as performance graded asphalts. Alternatively, the pumpable bottoms can be combined with fuel oil; however, the additives thus introduced confer less benefit than in asphalt.

In another preferred embodiment of the invention, the used lubricating oils contain at least 0.1 wt. %, preferably at least 1 wt. % of viscosity index improver, and said vaporization temperatures and contact times are such as to minimize decomposition of said viscosity index improver so as to provide a bottoms fraction containing at least 0.1 wt. %, preferably at least 1 wt. %, viscosity index improver.

In another aspect, the invention relates to a novel asphalt blend composition containing, an asphalt component and the used motor oil bottoms product prepared by the process of the present invention, with or without modification additives such as polymers, chemical gellants, and antioxidants and to paving compositions containing such modified asphalts. Generally, the asphalt blend compositions comprise (a) about 0.1 to about 20 wt. %, preferably about 0.5 wt. % to about 15 wt. % of used motor oil bottoms prepared by the process of the present invention, (b) about 0 to about 20 wt. %, preferably about 0 to about 10 wt. % of a polymer modifier, (c) about 0 to about 7 wt. %, preferably about 0 to about 5 wt. % of a chemical gellant and (d) at least about 80 wt. %, e.g., about 80 wt. % to about 99 wt. %, say, 90 wt. %, of an asphalt component obtained from conventional vacuum distillation, atmospheric distillation, solvent refining, e.g., solvent deasphalting bottoms, or naturally occurring mineral sources, e.g., Trinidad Lake asphalt. All percents herein are by weight of total composition. Asphalt paving compositions of such blend can exhibit a distinct improvement in low temperature properties, in their resistance to thermal cracking and fatigue as defined by the use of the new Superpave Performance Graded (PG) Asphalt Binder Specifications: AASHTO MP1.

In yet another aspect, the present invention relates to a pavement composition comprising aggregate and from about 1–10 wt. % of an asphalt blend containing at least about 80 wt. % of asphalt and from about 0.5–15 wt. % of the bottoms fraction of prepared by the process of the present invention.

BRIEF DESCRIPTION OF THE DRAWINGS

FIG. 1 is a schematic flow diagram illustrating a preferred embodiment of the process of the present invention for reclaiming used lubricating oil.

Further features and advantages of the present invention will become apparent to those skilled in the art from the description of the preferred embodiment herein set forth.

DESCRIPTION OF THE PREFERRED EMBODIMENTS

Process

The used lubricating oil that can be treated in accordance with the present invention includes used crankcase oil from motor vehicles such as, for example, cars, trucks and railroad locomotives, as well as automatic transmission fluids and other functional fluids in which the major constituent is an oil of lubricating viscosity. Unavoidably, used lubricating oil often contains amounts of water and other hydrocarbon liquids, e.g., light hydrocarbons having a boiling point of less than 600° F., e.g., less than 210° F. The present invention is especially advantageous inasmuch as no pre-separation of water and light hydrocarbons liquids is necessary.

Included within the group of used lubricating oils suitable for treatment herein are used motor oils having mineral lubricating oils such as liquid petroleum oils and solvent-treated or acid-treated mineral lubricating oils of the paraffinic, naphthenic or mixed paraffinic-naphthenic types as the base oil. Oils of lubricating viscosity derived from coal or shale oil can also be included as the base oil of such used motor oils. This group also includes used motor oils having as the base oil synthetic lubricating oils including hydrocarbon oils and halosubstituted hydrocarbon oils such as polymerized and interpolymerized olefins (e.g., polybutylenes, polypropylenes, propyleneisobutylene copolymers, chlorinated polybutylenes, etc.); poly(1-hexenes), poly(1-octenes), poly(1-decenes), etc. and mixtures thereof; alkylbenzenes (e.g., dodecylbenzenes, tetradecylbenzenes, dinonylbenzenes, di(2-ethylhexyl) benzenes, etc.): polyphenyls (e.g., biphenyls, terphenyls, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc. constitute another class of known synthetic lubricating oils that can be the base oil of the used lubricating oils treated in the present invention. These are exemplified by the oils prepared through polymerization of ethylene oxide or propylene oxide, the alkyl and aryl ethers of these polyoxyalkylene polymers ( e.g., methylpolyisopropylene glycol ether having an average molecular weight of 1000, diethyl ether of polyethylene glycol having a molecular weight of 500–1000, diethyl ether of polypropylene glycol having an average molecular weight of 1000–1500, etc.) or mono- and polycarboxylic esters thereof, for example, the acetic acid esters, mixed $C_3$–$C_8$ fatty acid esters, or the $C_{13}$ Oxo acid diester of tetraethylene glycol.

Another suitable class of synthetic lubricating oils that can be the base oil of the used lubricating oils treated by the present invention comprises the esters of dicarboxylic acids (e.g., phthalic acid, succinic acid, alkyl succinic acids and alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.). Specific examples of these esters include dibutyladipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like.

Esters useful as synthetic oils that the used lubricating oils to be treated can be derived from include $C_5$–$C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another class of synthetic oils that can be the base oil of the used lubricating oils that can be treated (e.g., tetraethyl silicate, tetraisopropyl silicate, tetra-(2-ethylhexyl)silicate, tetra-(4-methyl-2-ethylhexyl)silicate, tetra-(p-tert-butylphenyl)silicate, hexa-(4-methyl-2-pentoxy)-disiloxane, poly(methyl)siloxanes, poly (methylphenyl)siloxanes, etc.). Other synthetic oils include liquid esters of phosphorus-containing acids (e.g., tricresyl phosphate, trioctyl phosphate, diethyl ester of decylphosphonic acid, etc.), polymeric tetrahydrofurans and the like.

The term "lubricating oil" when used herein does not limit the utility of the oil to lubricating, but is merely a description of a property thereof, namely, that the oil is of lubricating viscosity.

The foregoing used lubricating oils usually contain one or more of various additives such as, for example, oxidation inhibitors (i.e., barium, calcium and zinc alkyl thiophosphates, di-t-butyl-p-cresol, etc.), anti-wear agents (i.e., organic lead compounds such as lead diorganophophorodithioates, zinc dialkyldithiophosphates, etc.), dispersants, (i.e., calcium and barium sulfonates and phenoxides, etc.), rust inhibitors (i.e., calcium and sodium sulfonates, etc.), viscosity index improvers, (i.e., polyisobutylenes, polyalkylstyrene, etc.), and detergents (i.e., calcium and barium salts of alkyl and benzene sulfonic acids and ashless type detergents such as alkyl-substituted succinimides, etc.). Additionally, the used lubricating oils treated in accordance with the present invention usually contain various contaminants resulting from incomplete fuel combustion as well as water and gasoline. The process of the present invention is particularly suitable for removing or reducing to acceptable levels (e.g., to permit subsequent hydrogenation without poisoning the hydrogenation catalyst) the above-indicated nitrogen-containing materials and metal-containing materials.

The process of the present invention is preferably carried out in a first stage wherein the used lubricating oil is stirred by the action of the impinging velocity of the heated vapor being introduced therein. The vessel containing the first stage can be entirely conventional in design and construction. The size, design and construction of such vessel is dependent upon the volume of used lubricating oil to be processed. In one embodiment, steam enters at the bottom of the vessel, vapor exits at the top of the vessel, and the first stage bottoms fraction or residue is drained from the bottom of the vessel. No internal components are necessary. In an especially preferred embodiment, the first stage reaction zone is a continuous stirred tank reactor.

The subsequent stage reaction zones can be operated as a plug flow reactor. In one embodiment, the subsequent stage reactor comprises a pipe located below and communicating with said first stage. The subsequent stage can operate at a higher temperature than the first stage so as to discharge vaporized overhead from the subsequent stage into the first stage to provide additional heating and agitation thereto. The subsequent stage also includes an outlet for removing subsequent stage bottoms fractions and an optional outlet for removing distillable hydrocarbons from the subsequent stage. Upon removal the subsequent stage bottoms fraction can be removed to another subsequent stage downstream or collected.

Asphalt Blend Compositions Containing Used Motor Oil Bottoms

Asphalt Component

Any suitable asphalt or asphalt cement may be employed for producing the modified asphalt blend compositions of the invention. For example, industrial asphalts used for coatings, sealants, roofing materials, adhesives, and other applications may be used. Paving grade asphalt compositions, however, are employed in the preferred embodiment of the invention. Asphalt compositions may be derived, as indicated, from any well known bituminous or asphaltic substance obtained from natural sources or derived from a number of sources such as petroleum, shale oil, coal tar, and the like, as well as mixtures of two or more of such materials. Typical of such asphalts are the straight run asphalts derived from the atmospheric, steam and/or vacuum distillation of crude oils, or those asphalts derived from solvent precipitation treatments of raw lubricating oils and their fractions. Also included are the thermal or "cracked" asphalts which are separated as cracker bottom residues from refinery cracking operations and the asphalts produced as byproducts in hydrorefining operations. A preferred asphalt is the vacuum tower bottoms that is produced during the refining of synthetic or petroleum crude oils. As indicated, for paving applications, any suitable paving grade asphalt may be employed for the compositions of the invention. Such paving grade asphalt compositions are often referred to as viscosity, penetration graded, or performance graded (PG) asphalts having penetrations up to 400 as measured by ASTM method D5. Preferred asphalts are the performance graded asphalts such as PG 46-40, PG 46-34, PG 46-28, PG 52-40, PG 52-34, PG 52-28, PG 52-22, PG 58-40, PG 58-34, PG 58-28, PG 58-22, PG 64-40, PG 64-34, PG 64-28, PG 64-22, PG 70-40, PG 70-34, PG 70-28, PG 70-22, PG 76-40, PG 76-34, PG 76-28, PG 76-22, PG 82-34, PG 82-28, or PG 82-22. The PG in the title refers to Performance Graded, the first numeric designation refers to the binder's high temperature rutting or deformation resistance temperature range limit, and the last numeric designation refers to the binder's low temperature thermal cracking resistance temperature limit. Complete specification requirements are outlined in specifications under AASHTO MP-1-93 Performance Graded Asphalt Binder Specification. AASHTO is the designation for the American Association of State and Highway Transportation Officials.

The asphalt blend compositions of asphalt component and the used motor oil bottoms of the present invention also exhibit improved low temperature performance properties without excessive sacrifice of high temperature PG grade performance, e.g., rutting resistance.

Polymer Modifiers

The polymers used for the present asphalt blends are well-known to those skilled in the art and comprise: Styrene Butadiene (SB) diblock polymers, Styrene-Butadiene-Styrene (SBS) triblock polymers which may be either linear or radial, styrene-isoprene-styrene (SIS) diblocked polymers, hydrotreated SBS, Styrene Ethylene Butadiene Styrene polymers (SEBS), Styrene Butadiene Rubber (SBR), polyacrylamide, e.g., those described in U.S. Pat. No. 4,393,155 to Garrett, Glycidyl-containing ethylene copolymers in U.S. Pat. No. 5,331,028, or Crumb Rubbers.

Gellants

Similarly, the gellants which can be added to the present asphalt blends are not narrowly critical and can include: chemical gellants such as metallic soaps formed by the neutralization of fatty acids and/or rosin acids; organoclays, e.g., bentonites, kaolin clays, etc.; hydrogenated castor oils; oligomers; siloxanes; or others well-known to those skilled in the art or included in the patent or other literature.

Antioxidants

Though not narrowly critical, preferred antioxidants are an oxidation inhibiting or stabilizing amount of a composition selected from metal hydrocarbyl dithiophosphates, and mixtures thereof, and a composition selected from antioxidant butylated phenols, and mixtures thereof, in a specified ratio to each other, as described more fully hereinafter. Preferably, the components are added to the oxidized blend of asphalt and fluxing component so that the resulting product comprises from about 0.1 wt. % to about 5.0 wt. % of a composition selected from metal hydrocarbyldithiophosphates, and mixtures thereof, and from about 0.1 wt. % to about 5.0 wt. % of a composition selected from antioxidant butylated phenols, and mixtures thereof, in a specified ratio to each other, as described more fully hereinafter. Most preferably, metal hydrocarbyl dithiophosphate component employed is a mixture of such dithiophosphates, and the metal hydrocarbyl dithiophosphate component is supplied in an amount of from about 0.1 wt. % to about 2.0 wt. %. The antioxidant butylated phenol is preferably supplied in a range of from about 0.1 wt. % to about 2.0 wt. %.

Hydrocarbon Solvents

The hydrocarbon solvents can be any which are capable of reducing the viscosity of the asphalt blend composition. Preferred solvents include: mineral spirits, naphthas, kerosenes, and fuel oils.

Emulsifiers

The emulsifiers include anionic or cationic or nonionic emulsifiers. Those particularly preferred are those described in U.S. Pat. No. 4,393,155 to Garrett, the contents of which are incorporated herein by reference.

Process Description

Referring to the drawing, raw, used lubricating oil containing 0–10 wt. % organo-metallic compounds, 0–10 wt. % water, 0–5 wt. % light hydrocarbons having a boiling point below 300° F., and 0–5 wt. % viscosity index improvers, which may or may not have been pretreated to remove water and lower boiling point liquids is passed through line 10 to first stage reactor vessel 20 which is controlled by valve 25. The first stage vessel is capable of holding about 10 to 1000 gallons, preferably 100 to 500 gallons of used lubricating oil. Steam superheated to a temperature of 700 to 1600° F., is introduced into the vessel through line 27 at a rate of 1 to 3 pounds/pound of charge, in order to heat the oil to a temperature of 600–650° F. by direct contact. The required contact time for the oil is dependent on the desired volume reduction and degree of lift. Decomposition of additives is also possible and may be a factor in setting time and temperature. Steam rate is adjusted to avoid entrainment of organo-metallic compounds into the overhead fraction which contains water, light hydrocarbons, and distillable oil. The overhead fraction is passed through line 28 into line 49 which passes into a vacuum distillation column 50 wherein lighter hydrocarbons (suited to use as fuel gas after separation) and water are taken off as overhead through line 55. The distillate oil may be recovered as a single product or may be fractionated to produce a number of distillate fractions which have the boiling range of the final lubricating oil product desired. Partial condensation, to condense distillate boiling range material and leave essentially all steam present as a vapor, is preferred. The collected distillate may be further treated by catalytic hydrogenation or clay treatment (not shown) to reduce sulfur content, improve color, saturate olefins and thereby increase stability and reduce gum forming compounds. The vacuum bottoms are taken off at 54 and may be used as fuel oil, asphalt extender, feedstock for delayed coking, feedstock for partial oxidation or a gasifier or for cement kiln fuel where the metal would remain in the product cement. The bottoms fraction from the vessel is removed continuously from line 29 to subsequent stage vessel 60. The subsequent stage vessel is capable of holding about 10 to 1000 gallons, preferably 100 to 500 gallons of first stage bottoms fraction. Steam superheated to a temperature of 700 to 1600° F., sufficient to provide a higher temperature than said first stage is introduced into the vessel through line 67 at a rate of 1 to 3 pounds/pound of charge, in order to heat the oil to a temperature of 600 to 650° F. by direct contact. The overhead fraction is passed through line 68 into line 25 to recycle steam and heated overhead to the first stage or alternatively to line 49 which passes into vacuum distillation column 50 for further treatment as discussed above. The bottoms fraction can be removed from the subsequent stage reactor through line 69 and passed to a subsequent stage for similar treating or used directly for addition to fuel oil or, alternatively, directed for mixing with asphalt in an asphalt mixing means 80.

By way of further illustration of the process of the present invention, reference may be made to the following example. Unless otherwise indicated, all parts and percentages are by weight.

EXAMPLE 1

Continuous Process

Used motor oil near ambient temperature was mixed rapidly in an atomizer with superheated steam to vaporize 70% to 80% of the oil. The residue separated from the steam oil vapor mixture and flowed to a residue accumulator. The steam-oil mixture was cooled first to 225° F., where most of the oil and little steam condensed. The heavy oil condensate separated from the remaining steam-oil vapor in an accumulator. The remaining steam-oil mixture which was nearly all steam was condensed and collected in a water condensate accumulator. The process avoided indirect heat transfer while ensuring that the highest temperature the oil reached was the atomizer outlet temperature. The atomized oil was cooled quickly so residence time at atomizer temperature is short. Steam stripping allowed a lower flash temperature for a given amount of used motor oil vaporization compared to atmospheric or even moderate subatmospheric flash vaporization. An equal weight of steam to used motor oil charge is equivalent to moderate vacuum flashing because the molecular weight of steam is 10 to 30 times less than that of used motor oil.

EXAMPLE 2

Asphalt Containing Used Motor Oil Bottoms Additive

Merey crude was distilled to cut temperatures of 825° F. and 850° F. to produce light and heavy bottom fractions possessing viscosities of 1779 and 2738 poise at 140° F. The heavier fraction was cut back with used motor oil residue to produce binders with viscosities similar to the lighter cut.

Used motor oil bottoms produced by the continuous steam process of the present invention using a lift rate of 85% provided a bottoms material having an API gravity of 13.4.

The following analytical results were obtained on the bottoms material

| % Element | % Element | % Element | % Element |
|---|---|---|---|
| 0.26 Mz | .7 Zn | 0.52 P | 0.73 Co |
| 1.13 S | .007 Cl | .110 Fe | .035 Pb |

Viscosities were similar to oils possessing a viscosity index of 200, suggesting that at least some of the viscosity improvers in the used motor oil remain intact during processing. These bottoms of contained only 3.1 wt. % heptane insolubles (compared to 21.7 wt. % for a commercially available used motor oil bottoms product) which suggests less degradation of additives during processing. High pressure liquid chromatography analysis of a typical used motor oil bottoms showed 76 wt. % saturates, 9 wt. % monoaromatics, 2 wt. % diaromatics, 1 wt. % 3-ring aromatics, 2 wt. % 4-ring aromatics, and 10 wt. % polars.

What is claimed:

1. A continuous process for recovering lubricating oil boiling range hydrocarbons from used lubricating oil comprising:
    i) continuously charging a used motor oil fraction to a Used Motor Oil (UMO) thermal treatment/vaporization means;
    ii) continuously injecting into said UMO a heating vapor comprising at least a majority, on a molar basis, of at least one member of the group of methane, ethane, propane, steam, and mixtures thereof, and wherein the amount and temperature of said injected heating vapor is sufficient to vaporize at least a majority, on a molar basis, of said lubricating oil boiling range components, which are continuously removed as an overhead vapor fraction as a product of the process; and
    iii) continuously removing from a bottom portion of said thermal treatment means a bottoms fraction.

2. The process of claim 1 wherein the feed to said process is a UMO and water emulsion and wherein said emulsion is subjected to indirect heat exchange or heating in a fired heater to heat said emulsion to a temperature sufficient to vaporize at least a majority of said water in said emulsion and produce a water vapor phase comprising a majority of said water in said emulsion and a stripped UMO fraction which is charged to said continuous treatment process.

3. The process of claim 2 wherein said stripped UMO is heat exchanged against said overhead product hydrocarbon vapors from said thermal treatment means.

4. The process of claim 1 wherein said heating vapor is superheated steam.

5. The process of claim 1 wherein said thermal treatment/vaporization is conducted at a temperature of 500 to 1000° F., a pressure of atmospheric to 5 atm, absolute and a weight ratio of injected heating vapor to UMO is from 0.1–10.

6. The process of claim 5 wherein said temperature is 450–700° F., said pressure is atmospheric to 2 atmospheres and the weight ratio of heating vapor to UMO ranges is from 0.5–3.

7. The process of claim 1 wherein said thermal treatment/vaporization temperature is 550–650° F. and the weight ratio of heating vapor to UMO is 0.5:1 to 1 to 1.5:1.

8. The process of claim 1 wherein said used UMO is preheated prior to introduction to the thermal treatment/vaporization means.

9. The process of claim 8 wherein said UMO is at partially fractionated or flashed to remove a majority by weight of at least one of chemical solvents boiling in the gasoline boiling range and gasoline boiling range components prior to thermal treatment.

* * * * *